E. J. KROEGER.
REINFORCED HARD RUBBER STRUCTURE.
APPLICATION FILED JULY 25, 1918.

1,286,030.

Patented Nov. 26, 1918.

Inventor
E. J. Kroeger
By Robert M Pierson
Atty.

UNITED STATES PATENT OFFICE.

EDWIN J. KROEGER, OF AKRON, OHIO, ASSIGNOR TO THE B. F. GOODRICH COMPANY, OF NEW YORK, N. Y., A CORPORATION OF NEW YORK.

REINFORCED HARD-RUBBER STRUCTURE.

1,286,030.   Specification of Letters Patent.   Patented Nov. 26, 1918.

Application filed July 25, 1918. Serial No. 246,789.

*To all whom it may concern:*

Be it known that I, EDWIN J. KROEGER, a citizen of the United States, residing at Akron, in the county of Summit and State of Ohio, have invented a certain new and useful Reinforced Hard-Rubber Structure, of which the following is a specification.

This invention relates to the mounting of metallic reinforcements in hard-rubber structures of various types, and it specifically relates to an improved mode of embedding a suspending plate in the wall of a hard-rubber receptacle, such as a large storage-battery jar. Heretofore, the embedding of metal in hard rubber has in many cases given rise to the cracking of the rubber owing to its contraction around the metal on cooling down from the temperature of vulcanization. I have discovered that by surrounding the embedded plate or other similar reinforcement with soft rubber, this difficulty may be avoided.

Of the accompanying drawings.

Figure 2:
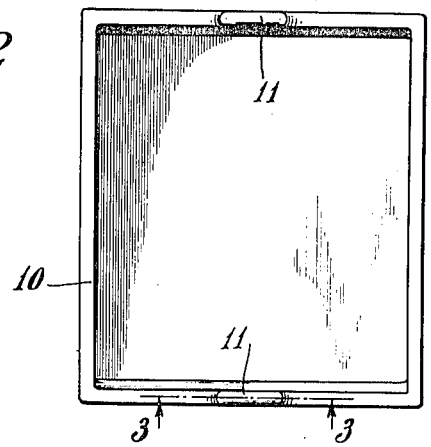
Fig. 2 is a top plan view thereof.
Figure 1:
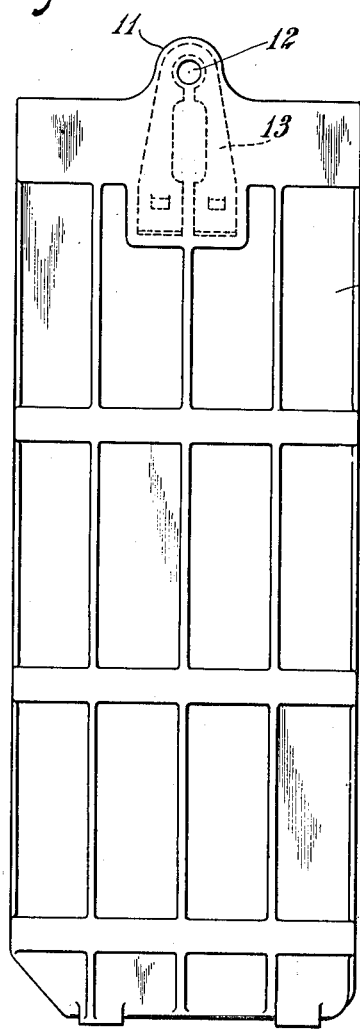
Figure 1 is a side elevation of a large storage-battery jar provided with my improved means for reinforcing the walls at the suspending points.
Figure 3:
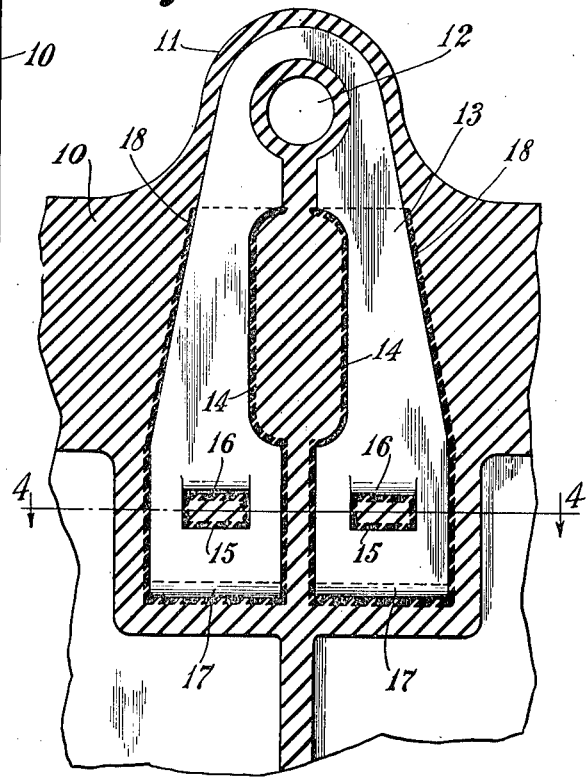
Fig. 3 is an enlarged section on the line 3—3 of Fig. 2.
Figure 4:
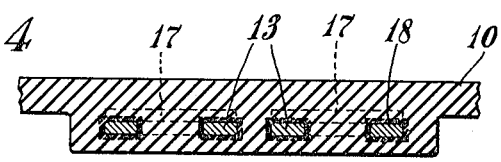
Fig. 4 is a horizontal section on the line 4—4 of Fig. 3.

In the drawings, 10 is the battery jar or receptacle made of hard rubber, provided, as is usual in the larger sizes of these jars such as are used for submarine batteries, with a pair of suspending ears 11, 11 formed with apertures 12 for the reception of hoisting hooks.

In each ear is embedded a reinforcing plate 13 having the approximate shape of an inverted U looped over the aperture 12, the legs of said plate being recessed at 14, apertured at 15 and flanged at 16, 17 to provide anchorage in the material of the jar wall.

18, 18 are sheaths of soft vulcanized rubber incasing the legs of the plate 13 and surrounded by the hard rubber, these incasements being formed by wrapping sheets of soft-rubber compound upon the plate before the latter is incorporated in the wall of the jar 10, the whole being then vulcanized together. The soft rubber forms a cushion between the metal and the hard rubber which distributes the strains due to the contraction of the hard rubber on cooling after it has been vulcanized, so as to avoid cracking of the hard-rubber wall, and also provides a better union between the metal and hard rubber than can be obtained by bringing them directly in contact.

I claim:

1. A hard-rubber structure having an embedded metallic reinforcement, and a cushion of soft rubber between the metal and the hard rubber.

2. The combination of a metallic member, a sheath of soft vulcanized rubber immediately surrounding said member, and a hard-rubber structure embedding the incased metallic member.

3. A composite rubber and metal structure comprising hard rubber, a soft rubber cushion embedded within and vulcanized to the hard rubber, and a metallic reinforcement embedded within said soft rubber cushion.

4. A container comprising a wall of hard rubber, a soft-rubber cushion embedded within and vulcanized to the hard rubber, and a metallic reinforcement of skeleton form embedded within and having its openings occupied by the soft rubber.

5. An inclosure having a hard rubber wall, a sheet-metal reinforcement embedded within and parallel to the surfaces of said wall, and a cushion of hard rubber embedding said reinforcement and permanently united thereto and to the hard rubber by vulcanization.

6. The combination of a hard-rubber receptacle formed with a suspending aperture, a metallic reinforcing member embracing said aperture and embedded in the hard rubber, and a cushion of soft rubber immediately incasing said reinforcing member.

7. The combination of a hard-rubber receptacle formed with a suspending aperture, a reinforcing plate embedded in the hard-rubber wall of said receptacle and shaped substantially like an inverted U looped over said suspending aperture, and a cushion of soft rubber immediately incasing the legs of said plate.

In testimony whereof I have hereunto set my hand this 16th day of July, 1918.

EDWIN J. KROEGER.